US012759725B2

(12) United States Patent
Sarkar et al.

(10) Patent No.: US 12,759,725 B2
(45) Date of Patent: Oct. 13, 2026

(54) SYSTEMS AND METHODS FOR FUEL TANK INERTING

(71) Applicant: Eaton Intelligent Power Limited, Dublin (IE)

(72) Inventors: Subrata Sarkar, Pune (IN); Matthew Darren Jones, Hampshire (GB)

(73) Assignee: Eaton Intelligent Power Limited, Dublin (IE)

( * ) Notice: Subject to any disclaimer, the term of this patent is extended or adjusted under 35 U.S.C. 154(b) by 618 days.

(21) Appl. No.: 18/340,489

(22) Filed: Jun. 23, 2023

(65) Prior Publication Data

US 2023/0415910 A1 Dec. 28, 2023

Related U.S. Application Data

(60) Provisional application No. 63/355,359, filed on Jun. 24, 2022.

(51) Int. Cl.

| | |
|---|---|
| ***B64D 37/32*** | (2006.01) |
| ***B01F 23/20*** | (2022.01) |
| ***B01F 25/312*** | (2022.01) |
| ***B01F 35/71*** | (2022.01) |
| ***B01F 35/90*** | (2022.01) |

(52) U.S. Cl.

CPC .............. *B64D 37/32* (2013.01); *B01F 23/29* (2022.01); *B01F 25/312* (2022.01); *B01F 35/714* (2022.01); *B01F 35/71805* (2022.01); *B01F 35/90* (2022.01); *B01F 2035/99* (2022.01)

(58) Field of Classification Search

CPC ...... B01F 23/29; B01F 25/312; B01F 35/714; B01F 35/71805; B01F 35/90; B01F 2035/99; B64D 37/32

See application file for complete search history.

(56) References Cited

U.S. PATENT DOCUMENTS 7,918,358 B2 * 4/2011 Gupta .................... B64D 37/32 220/88.3
7,955,424 B2 * 6/2011 Gupta .................... B64D 37/34 96/108

(Continued)

FOREIGN PATENT DOCUMENTS

EP 3 360 791 B1 8/2018

OTHER PUBLICATIONS

Burns et al., "Inerting of a Vented Aircraft Fuel Tank Test Article With Nitrogen-Enriched Air," DOT/FAA/AR-01/6 Office of Aviation Research Washington, D.C. 20591, Apr. 2001 (29 ppgs.).

*Primary Examiner* — Charles S Bushey
(74) *Attorney, Agent, or Firm* — Merchant & Gould P.C.

(57) ABSTRACT

The present disclosure relates generally to a system for inerting a fuel tank. The system includes a fuel pump, a jet ejector, a first flow path between the fuel pump and the jet ejector, a valve along the first flow path, the valve blocking the fuel flow from the fuel pump to the jet ejector when closed, a second flow path from the ullage of the fuel tank to the jet ejector to allow fuel vapor from the ullage to travel from the ullage to the jet ejector, a vaporizer downstream of the jet ejector and configured to vaporize the fuel received from the jet ejector into the fuel vapor, and a third flow path along which the fuel vapor flows from the vaporizer to the ullage so that an fuel-air ratio in the ullage of the fuel tank is maintained at greater than a flammable fuel-air ratio.

20 Claims, 9 Drawing Sheets

(56) References Cited

U.S. PATENT DOCUMENTS

| | | | | |
|---|---|---|---|---|
| 9,016,078 | B2 * | 4/2015 | Gupta | B64D 37/32 62/172 |
| 10,633,110 | B2 * | 4/2020 | Sarkar | A62C 3/065 |
| 10,640,227 | B2 | 5/2020 | Smith et al. | |
| 12,006,059 | B2 * | 6/2024 | Massie | A62C 3/08 |
| 12,258,142 | B2 * | 3/2025 | Jones | B01D 53/002 |
| 2013/0341465 | A1 * | 12/2013 | Massey | B64D 13/06 137/12 |
| 2020/0180779 | A1 * | 6/2020 | Emerson | B64D 37/32 |

* cited by examiner

300

310 $$\text{Fuel air ratio (t) in the tank} = \frac{\textit{mass of fuel vapor}}{\textit{mass of air}} > 0.24$$

320 $$\text{Fuel air ratio (t) in the tank} = \frac{\textit{mass of fuel vapor}}{\textit{mass of air}} = 1.00$$

FIG. 3

SYSTEMS AND METHODS FOR FUEL TANK INERTING

TECHNICAL FIELD

The present disclosure relates generally to a system and method for making a fuel tank ullage non-flammable and more particularly to a system and method for making an aircraft fuel tank non-flammable through enrichment of the ullage using fuel vapor.

BACKGROUND

Aircraft fuel tank explosions are typically rare and random in nature. Fuel tank explosion prevention is important for aviation industries. At present, it is often achieved through continuous inerting, i.e., rendering chemically inert, of fuel tanks using nitrogen. This kind of system typically has a low reliability and a high life cycle cost. Also, it is typically known to treat the portion of a tank above the liquid fuel in an aircraft fuel tank, referred to as ullage, to prevent the tank from combusting. In these types of aircraft fuel tanks, it is sometimes desirable to keep the concentration of fuel in the ullage mixture at a low level.

Systems have been developed to enhance fuel tank safety. Example systems are described in U.S. Pat. Nos. 7,918,358, 9,016,078, and 7,955,424, and U.S. Patent Publication No. US20130341465, which are incorporated herein by reference in their entireties.

SUMMARY

In one aspect, the technology relates to a system for inerting a fuel tank including a liquid fuel region and an ullage. The system may include a fuel pump, a jet ejector, a first flow path extending between the fuel pump and the jet ejector, a valve disposed along the first flow path, the valve allowing fuel to flow along the first flow path from the fuel pump to the jet ejector when open, the valve blocking the fuel flow from the fuel pump to the jet ejector when closed, a second flow path extending from the ullage of the fuel tank to the jet ejector to allow fuel vapor from the ullage to travel from the ullage to the jet ejector and to mix with the fuel from the fuel pump, a vaporizer disposed downstream of the jet ejector, the vaporizer being configured to vaporize the fuel received from the jet ejector into the fuel vapor and air mixture from the ullage to generate an enhanced fuel vapor and air mixture, and a third flow path along which the enhanced fuel vapor and air mixture flows from the vaporizer to the ullage so that an fuel-air ratio in the ullage of the fuel tank is maintained at greater than a flammable fuel-air ratio. In examples of the above aspect, a ratio of a mass of fuel vapor to a mass of air in the ullage is equal to or greater than 0.24. In another example, the enhanced fuel-air ratio includes a richer fuel-air ratio.

In certain examples, the system further includes a flame arrestor disposed between the jet ejector and the vaporizer; and a flame arrestor disposed between the vaporizer and the fuel tank.

In some implementations, the vaporizer includes a heater; and the fuel tank is an aircraft fuel tank. In other implementations, the system further includes a controller configured to manage operation of the valve; where the controller is configured to manage operation of the fuel pump; and the controller is configured to manage operation of the vaporizer.

In certain examples, the system may also include one or more sensors operationally coupled to the controller, wherein the controller is configured to manage operation of the valve at least partly based on information provided by the one or more sensors; where the one or more sensors includes a pressure sensor disposed in the ullage; the one or more sensors includes a pressure sensor disposed downstream of the fuel pump and upstream of the jet ejector; and the one or more sensors include one of a pressure sensor, a temperature sensor, or a combination of a pressure sensor and a temperature sensor.

In another aspect, the technology relates to a method for inerting a fuel tank, the system including a fuel pump, a fuel pump valve, a jet ejector, and a fuel vaporizer. The method may include opening the fuel pump valve, pumping fuel from the fuel pump, through the fuel pump valve, and towards the jet ejector to mix with fuel vapor and air mixture pulled from the ullage to the jet ejector, heating the pumped fuel to vaporize the pumped fuel to generate an enhanced fuel vapor and air mixture, and directing the enhanced fuel vapor to the ullage. For example, a fuel-air ratio in the ullage is maintained at greater than a flammable fuel-air ratio.

In an example of the above aspect, the fuel tank is an aircraft fuel tank, and the method further includes starting operation of the aircraft after the fuel-air ratio in the ullage is set at greater than the flammable fuel-air ratio. In an example, heating the pumped fuel vapor is performed at a vaporizer; opening the fuel pump valve includes determining the fuel-air ratio in the ullage is less than the flammable fuel-air ratio, and sending a control signal from the controller to the fuel pump valve; pumping fuel from the fuel pump includes sending a control signal from the controller to the fuel pump in response to determining the fuel-air ratio in the ullage is less than the flammable fuel-air ratio; determining the fuel-air ratio in the ullage is less than the flammable fuel-air ratio includes receiving an ullage pressure reading from a pressure sensor disposed at the ullage. In another example, the method further includes determining the fuel-air ratio within the ullage is no less than the flammable fuel-air ratio, and closing the fuel pump valve. In yet another example, determining the fuel-air ratio within the ullage is no less than the flammable fuel-air ratio includes receiving a flow pressure reading from a pressure sensor disposed upstream of the jet ejector and downstream of the fuel pump.

In yet another aspect, the technology relates to a system for inerting a fuel tank including a fuel pump, a fuel pump valve coupled to the fuel pump, a jet ejector in fluid communication with the fuel pump valve, a fuel vaporizer coupled to the jet ejector, one or more sensors at least at the fuel pump valve and in the fuel tank, the one or more sensors including one of a temperature sensor, a pressure sensor, or a combination of a temperature sensor and a pressure sensor, an updatable data repository, a processor operatively coupled to the one or more sensors, the fuel pump, the fuel pump valve, the jet ejector, the vaporizer, and to the updatable data repository, and a memory coupled to the processor. The memory stores instructions that, when executed by the processor, perform a set of operations including determining, via the one or more sensors, at least one of an ullage of the fuel tank, a fuel present in the fuel tank, a pressure inside the fuel tank and a temperature inside the fuel tank, setting, via the processor, system parameters so as to ensure a fuel rich ullage, and based on set system parameters, controlling, via the processor, a flow of fuel vapor in the ullage to maintain an fuel-air ratio in the ullage to be greater than a flammable fuel-air ratio.

In an example of the above aspect, the set of operations includes controlling the flow of fuel vapor in the ullage by controlling an amount of motive flow fuel and an amount of fuel vapor and air mixture from the ullage being mixed together in the jet ejector to create a droplets mixture, transferring the droplets mixture from the jet ejector to the vaporizer, vaporizing the droplets mixture into fuel vapor, and transferring the enhanced fuel vapor and air mixture into the ullage. In other examples, the fuel-air ratio is such that fuel combustion does not occur; and a ratio of a mass of fuel vapor to a mass of air in the ullage is equal to or greater than 0.24.

BRIEF DESCRIPTION OF THE DRAWINGS

The accompanying drawings, which are incorporated in and constitute a part of the description, illustrate several aspects of the present disclosure. A brief description of the drawings is as follows:

FIG. 3 illustrates equations used to determine fuel-air ratio, according to various examples of the disclosure.

DETAILED DESCRIPTION

Figure 1:
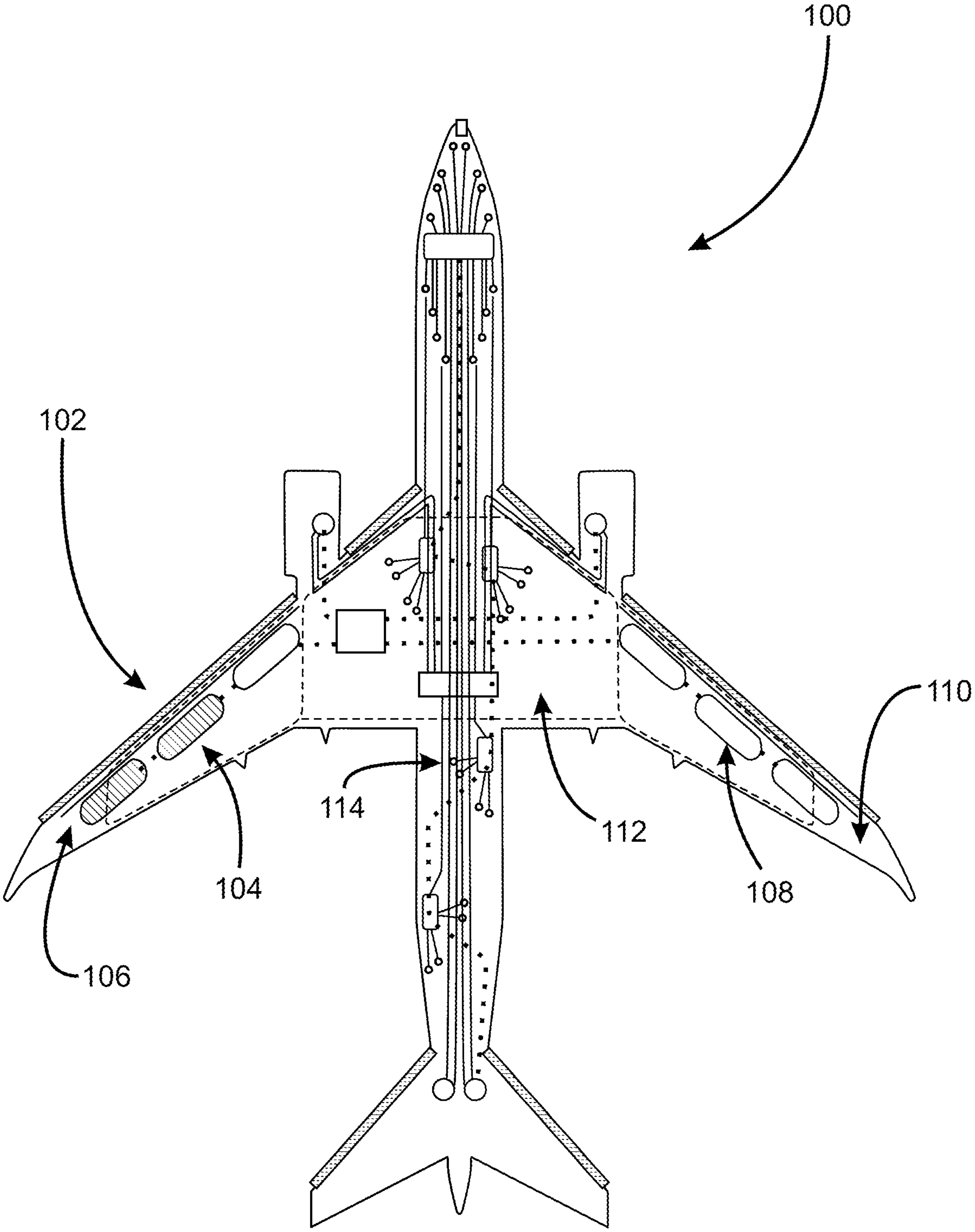
FIG. 1 illustrates a cross-sectional top view of an aircraft with an aircraft fuel system in accordance with principles of the present disclosure.

Various examples of this disclosure describe a novel fuel tank inerting system (FTIS) that creates a fuel rich environment through continuously supplying fuel vapor. The life-cycle cost of the above system is less than more traditional systems as it is a simplified system that provides high reliability. Improved systems for rendering the vapor-air mixture in the ullage of a fuel tank effectively non-flammable provides substantial advantages in terms of cost and safety.

In order for a fuel tank explosion to occur, a number of requirements need to be met. These requirements typically include fuel vapor, oxygen, heat or ignition source, and confined space. In addition, ignition can happen for a range of fuel-air ratios as a function of altitude and fuel tank temperature. There are generally three (3) technology streams for fuel tank explosion prevention: active technology, reactive technology, and passive technology. For example, passive technology includes using reticulated polyether foam, or using expanded metal products, to prevent fire ignition or explosion. In another example, reactive technology includes Parker Reaction Explosion Suppression Systems (PRESS), and Linear Fire Extinguishers (LFE) using distilled water, aqueous film-forming foam (AFFF) and water solution, a mixture of AFFF, water and Halon gas, a mixture of water and monoammonium phosphate powder, a mixture of 30% $CaCl_2$ and $H_2O$, a mixture of 50% or 70% ethylene glycol and water, a mixture of Halon 1301 and water, a mixture of propane and pentane, a mixture of monoammonium phosphate powder and Halon 1301, a mixture of FC-218, HFC-221 and HFC-125, or water mist. Other types of reactive technology include scored canister systems (SCS), nitrogen-inflated ballistic bladder systems (NIBBS), and solid propellant gas generators (SPGG). Out of these technologies, the active technologies are typically found to be most advantageous, but may be expensive due to low reliability. Current regulations mandate avoiding fuel tank ignition/explosion through, e.g., active inerting of the fuel tank. For example, aircrafts are typically fitted with air separation module (ASM)-based inerting systems, which may cause disruptions in operations and an increase in costs. ASM-based systems typically introduce an inert gas such as nitrogen to displace the oxygen in the ullage in order to reduce or prevent the occurrence of an ignition or explosion in the fuel tank.

As discussed above, for a fire explosion to occur, three (3) fundamental requirements include i) a given combination of air-fuel vapor mixture, ii) a heat source, and iii) a confined space. Accordingly, by eliminating any one or more of these requirements, the occurrence of an explosion may be reduced or eliminated. With respect to the first requirement, the combination of air-fuel vapor mixture, if the air-fuel vapor mixture is either too rich in fuel vapor or too lean in fuel vapor, then the explosion may not happen. An air-fuel vapor mixture that is too rich means that the vapor mixture has less air that the stochiometric ratio and is thus rich in fuel vapor. A vapor mixture that is too lean means that the vapor mixture has more air than the stochiometric ratio and is thus lean or poor in fuel vapor. The air-fuel flammable ratio is the ratio between air and fuel vapor at which complete combustion takes place because there is sufficient air to completely burn all of the fuel in the fuel tank. The air-fuel flammable ratio may be a range instead of a single value, where the amount of air may be sufficient to burn at least some of the fuel in the fuel tank. Accordingly, it may be possible to prevent or reduce the occurrence of an explosion by maintaining the air-fuel vapor mixture in, e.g., a range that renders the air-fuel vapor mixture too rich or too lean to create an ignition and/or a combustion of the fuel in the fuel tank. For example, it may be possible to prevent or reduce the occurrence of an explosion by maintaining the air-fuel vapor mixture in a range that renders the air-fuel vapor mixture too rich in fuel vapor.

Advantages of the approach according to the examples in the disclosure include utilizing existing airframe pump infrastructure, which reduces cost, the ability to continuously operate, and the reduction of fuel vapor emissions as compared to other systems. Reference will now be made in detail to the examples of the present disclosure that are illustrated in the accompanying drawings. Wherever possible, the same reference numbers will be used throughout the drawings to refer to the same or like structure.

FIG. 1 illustrates a cross-sectional top view of an aircraft with an aircraft fuel system in accordance with principles of the present disclosure. FIG. 1 illustrates an example top view of an aircraft 100 that includes an example system 102 for increasing the concentration of fuel vapor in the ullage of a fuel tank. Although the example system 102 is shown applicable to an aircraft, it would be understood that the principles of the present disclosure can be applied to reduce the flammability of any fuel tank.

The system 102 includes a first fuel tank 104 that occupies most of a first wing volume 106 of the aircraft 100, a second fuel tank 108 that occupies most of a second wing volume 110 of the aircraft 100, and a center fuel tank 112 positioned within an aircraft fuselage 114. In certain examples, the fuel tanks of the aircraft may have an alternative or different arrangement while still allowing the aircraft 100 to function as described herein. In certain examples, the first fuel tank 104, the second fuel tank 108 and the center fuel tank 112 may each include the system 100 described herein for maintaining or increasing fuel vapor content within each fuel tank. In other examples, the system 100 may be used for the first fuel tank 104, the second fuel tank 108, and/or the center fuel tank 112. In various examples, the system 100 renders a fuel tank ullage non-flammable by displacing air such that the vapor-air mixture is too rich and above a higher flammability limit.

Figure 2:
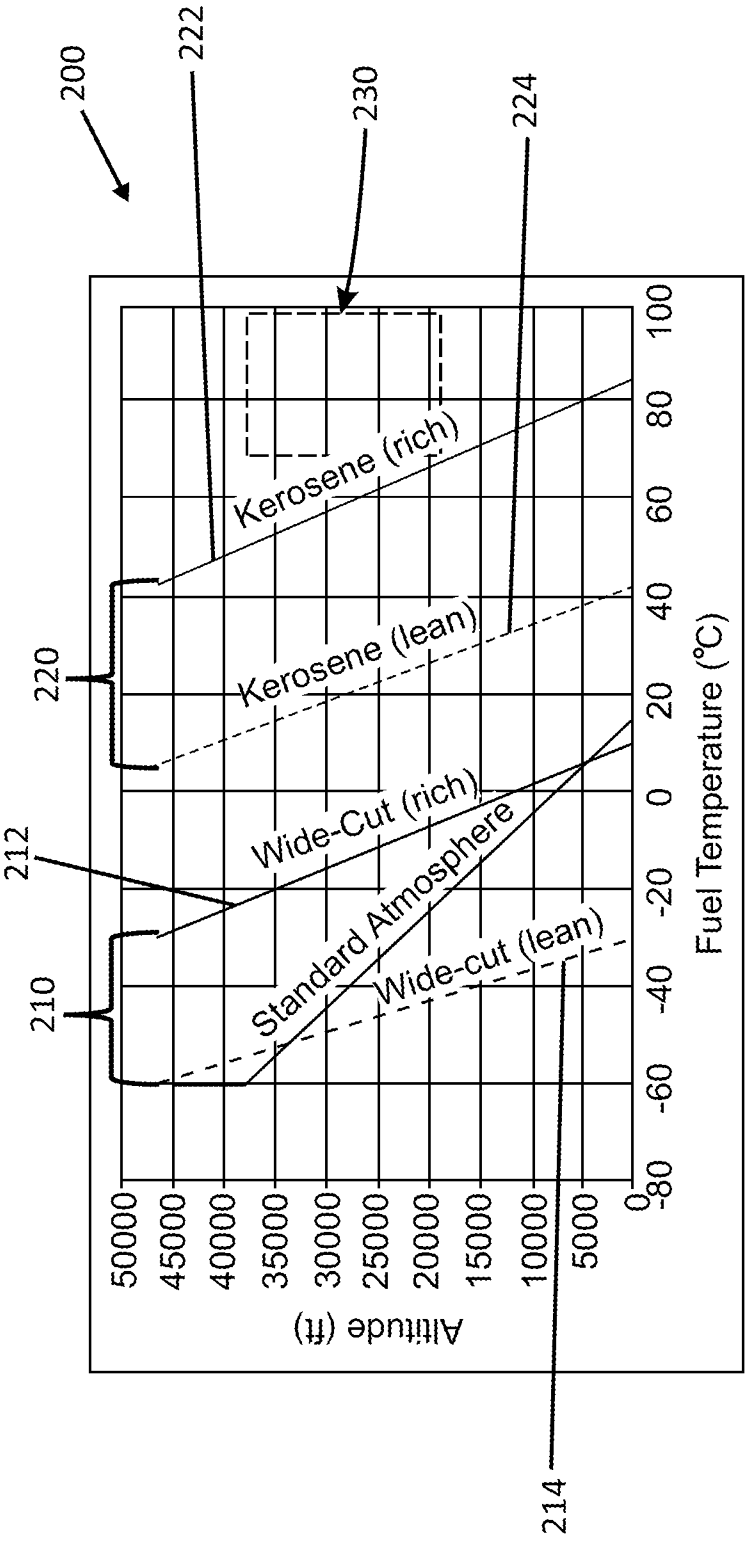
FIG. 2 illustrates fuel tank flammability envelopes.

FIG. 2 is a graph 200 illustrating fuel tank flammability envelopes 210 and 220 with respect to altitude of the plane and temperature of the fuel. Specifically, the graph 200 shows areas within each envelope 210 and 220 where the air-fuel mixture is conducive to fuel combustion, and areas where it is not. In the graph 200, the areas where the air-fuel mixture is conducive to fuel combustion vary depending on altitude and temperature. Specifically, as the x-axis represents fuel temperature and the y-axis represents the altitude of the fuel when in, e.g., an aircraft fuel tank, envelope 210 illustrates the area where a wide-cut fuel is combustible, the combustible area being the area between the two curves 212 and 214, the curve 212 representing the "rich" limit of the wide-cut fuel, and the curve 214 representing the "lean" limit of the wide-cut fuel. Similarly, envelope 220 illustrates the area where kerosene fuel is combustible, the combustible area being the area between the two curves 222 and 224, the curve 222 representing the "rich" limit of the kerosene fuel, and the curve 224 representing the "lean" limit of the kerosene fuel. In various examples, maintaining the fuel-air ratio in the fuel tank so that the fuel remains outside of envelope 210 or 220 may reduce or prevent the occurrence of fuel combustion in the fuel tank. In FIG. 2, a region that is outside the envelope 220 is illustrated as region 230. If air-fuel combination is in region 230, the possibility of ignition and/or explosion of kerosene in the fuel tank is greatly reduced or prevented.

FIG. 3 illustrates equations 300 used to establish a desired range for the fuel air ratio discussed above. The fuel air ratio as discussed herein refers to a ratio of the mass of fuel vapor to the mass of air in the ullage. For example, a fuel air ratio that ensures that the air-fuel combination in the fuel tank remains in a fuel-rich region such as, e.g., region 230 illustrated in FIG. 2, may be expressed by equation 310. In examples, when the fuel air ratio is greater than 0.24 as expressed in equation 310, the fuel air mixture is outside of either of the envelopes 210 and 220 discussed above with respect to FIG. 2, and is thus not likely, or is less likely, to experience ignition and/or combustion of the fuel in the fuel tank. In other examples, the fuel air ratio in the tank may also be up to 1, as expressed in equation 320, or more generally be equal to or greater than 0.24 and less than 1. When the fuel air ratio is up to, or equal to, 1, then the risk of combustion of fuel in the fuel tank is prevented or substantially reduced due to the richness of the fuel vapor in the ullage.

Figure 4A:
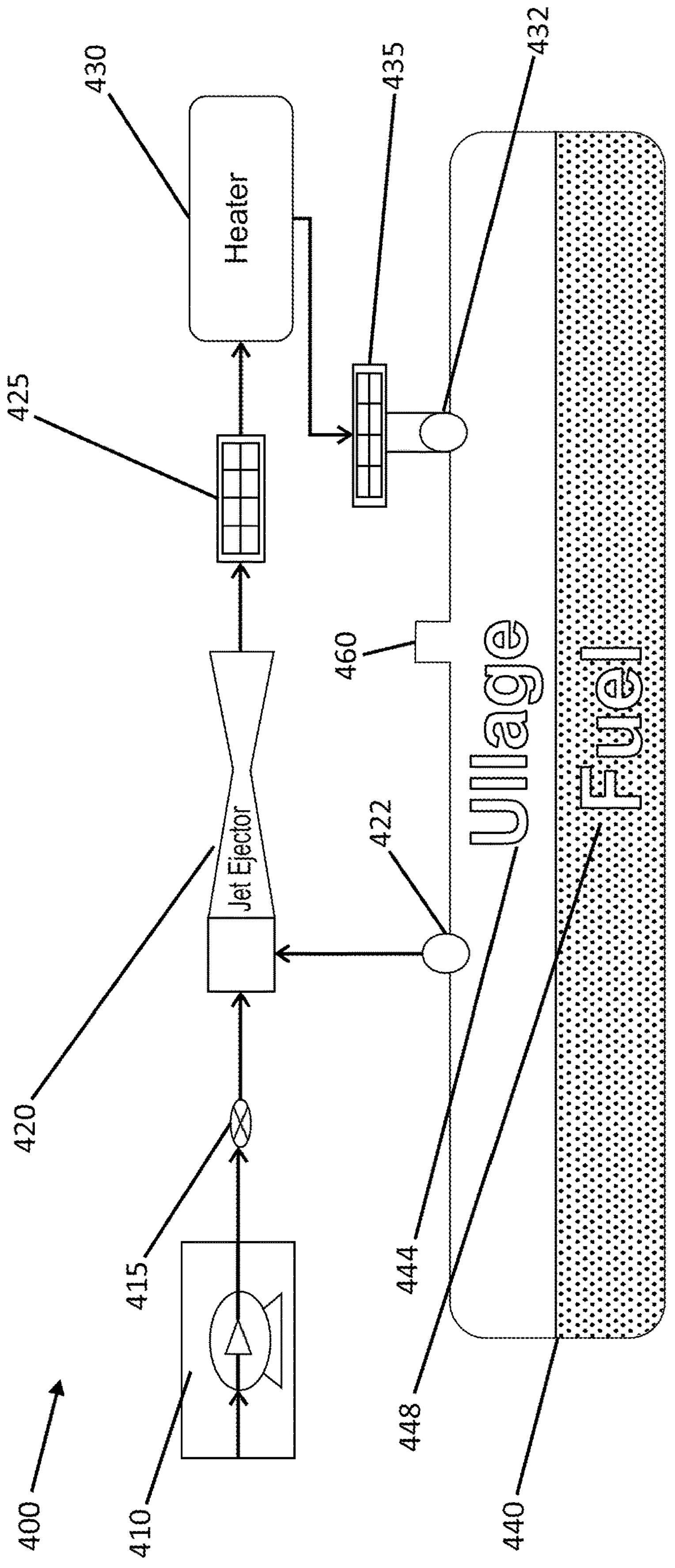
FIGS. 4A-4B illustrate schematic views of a system for inerting an aircraft fuel tank through continuous enrichment of ullage using fuel vapor, in accordance with examples of the present disclosure.
Figure 4B:
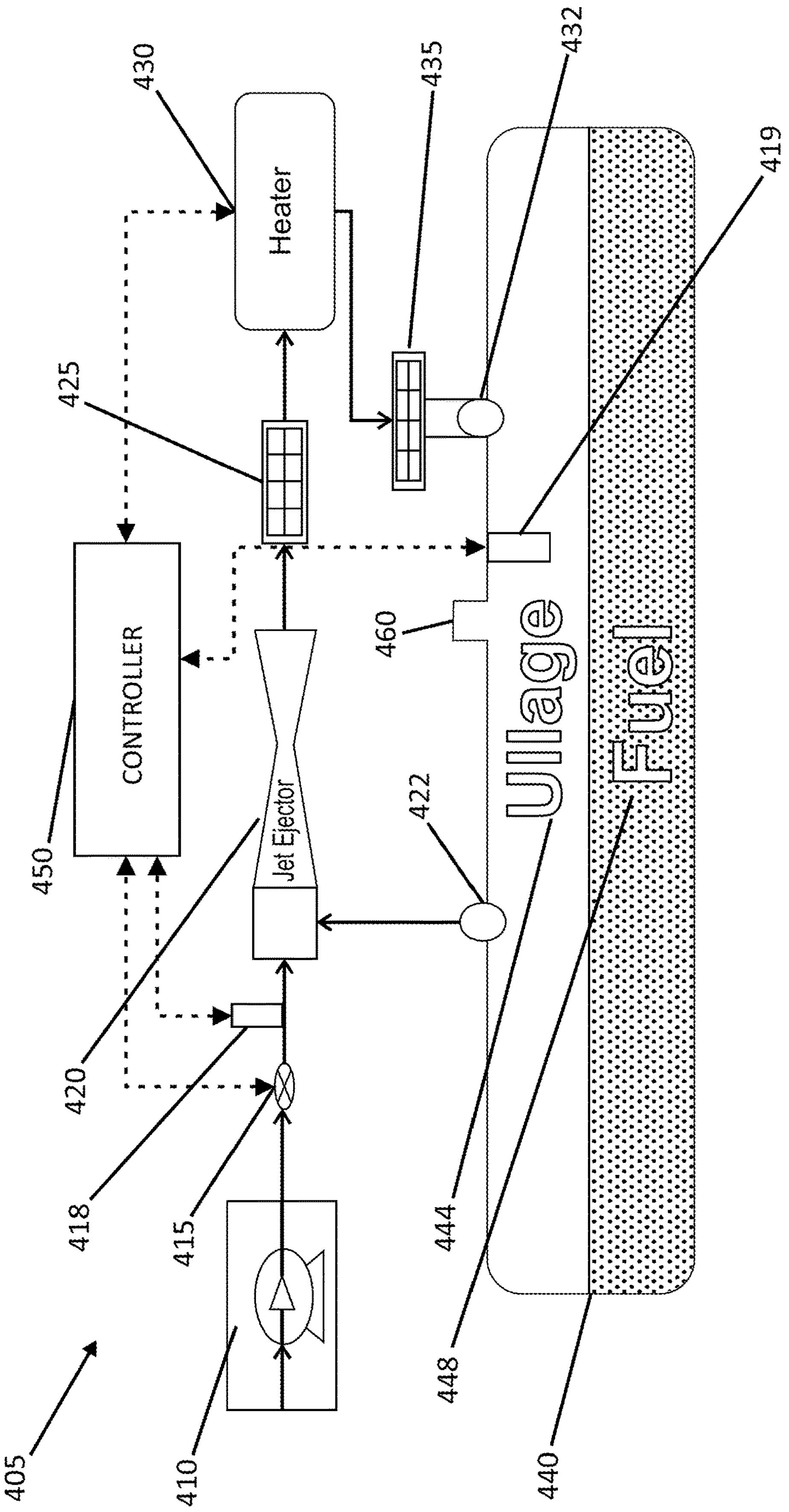

FIGS. 4A-4B illustrate schematic views of a system for inerting an aircraft fuel tank through continuous enrichment of ullage using fuel vapor, in accordance with examples of the present disclosure. FIG. 4A illustrates a schematic view of a fuel tank inerting system 400 for inerting a fuel tank through continuous enrichment of the ullage using fuel vapor. In FIG. 4A, a pump 410 such as, e.g., an airframe pump 410, provides fuel that has not been consumed, or motive flow fuel, to the jet ejector 420. A flow path, e.g., a first flow path, may extend between the fuel pump 410 and the jet ejector 420. The pump 410 may be part of a fuel system 405. In examples, the airframe pump 410 is inexpensive and substantially reliable, and reintroduces fuel that has not been consumed in addition to the motive flow fuel back into to fuel tank 440. In other examples, the airframe pump 410 may be powered by an engine that powers the aircraft, or the vehicle, that contains the fuel tank 440. In yet other examples, the airframe pump 410 consumes motive flow from airframe fuel pump or spillage flow from the engine of the aircraft or vehicle. In various examples, the fuel tank 440 includes an ullage gas mixture (i.e., mixture of fuel and air) in an ullage 444 and a quantity of fuel 448. The fuel tank 440 may include a vent 460 configured to allow fuel/air vapor to escape the ullage 444. During system operations, the ullage gas mixture or fuel vapor may be withdrawn from an outlet device or outlet 422 of the fuel tank 440 by, e.g., a compressor (not shown) which may be, e.g., a positive displacement compressor. In examples, the fuel vapor may be withdrawn from the outlet 422 and provided to, e.g., the jet ejector 420. A flow path, e.g., a second flow path may extend from the ullage 444 to the jet ejector 420 via the outlet 422. The second flow path may allow fuel vapor from the ullage 444 to travel from the ullage 444 to the jet ejector 420 and to mix with the fuel from the fuel pump 410.

In examples, the valve 415, disposed along the flow path between the pump 410 and the jet ejector 420, may allow fuel to flow along the flow path from the fuel pump 410 to the jet ejector 420 when open, the valve 415 blocking the fuel flow from the fuel pump 410 to the jet ejector 420 when closed. In various examples, the motive or spillage fuel generated by the airframe pump 410 and the vapor drawn from the ullage 444 are mixed in the jet ejector 420, and are discharged out of the jet ejector 420 in the form of droplets mixture. In other examples, because turbulence in the jet ejector 420 breaks the mixture of motive fuel and air vapor into droplets, the release of the jet ejector 420 may include both air vapor and fuel droplets.

In various examples, the vapor and fuel droplets mixture emitted by the jet ejector 420 are received at a vaporizer 430 disposed downstream of the jet ejector 420 and which may include a heater and which may heat and transforms the fuel droplets and air vapor mixture to fuel vapor, and supplies the fuel vapor to the fuel tank 440 via, e.g., inlet device or inlet 432. The vaporizer 430 may include an electric heater, or another type of heater, and is configured to vaporize the fuel received from the jet ejector 420 into the fuel vapor from the ullage 444 to generate an enhanced fuel vapor via a flow path, e.g., a third flow path. The third flow path may be the flow path along which the enhanced fuel vapor flows from the vaporizer 430 to the ullage 444 so that an fuel-air ratio in the ullage 444 of the fuel tank 440 is maintained at greater than a flammable fuel-air ratio. In various examples, the fuel vapor may increase the effectiveness of the enrichment of the ullage 444 because the fuel vapor may include lighter hydrocarbons that spread over the ullage 444 relatively quickly, particularly when provided in fuel vapor form from the vaporizer 430. The spread over the ullage 444 may not be as fast when the fuel transmitted from the vaporizer 430 is in droplet form. In various examples, the vaporizer 430 may be a simple pipe with straight or spiral configuration, and the purpose of the vaporizer 430 may be to transform the fuel droplets received from the jet ejector 420 into a vapor phase. In other examples, vaporization of the received fuel droplets at the vaporizer 430 may be accelerated by the use of a catalyst present in the vaporizer 430.

In various examples, a safety device such as, e.g., a flame arrestor 425, may be provided or disposed between the jet ejector 420 and the vaporizer 430. In other examples, another safety device such as another flame arrestor 435 may be provided or disposed between the vaporizer 430 and the fuel tank 440. In examples, the flame arrestors 425 and/or 435 may reduce or prevent the occurrence of ignition of the fuel or fuel vapor during travel of the fuel or fuel vapor between the jet ejector 420 and the vaporizer 430, and/or between the vaporizer 430 and the fuel tank 440.

In addition to the valve 415, the fuel tank inerting system 400 may further include one or more flow control valves or nozzles (not shown) at, e.g., the jet ejector 420, which may be configured to generate a sufficient amount of fuel vapor to be transferred into the ullage 444 so as to arrive at an fuel-air ratio in the ullage 444 or the fuel tank 440 that reduces or prevents the occurrence of combustion in the fuel tank 440. Such fuel-air ratio may be, e.g., a "rich" fuel-air ratio, as discussed above with respect to FIG. 2. The amount of fuel vapor in the ullage 444 is determined by the valve 415 and, e.g., other nozzles or valves as discussed above, so as to shift the fuel-air ratio in the fuel tank 444 to a range that is beyond the flammable or combustion zone based on e.g., fuel temperature, altitude, amount of air-fuel vapor, and atmospheric pressure. For example, a flow control valve (not shown) at the jet ejector 420 may be open, and high-pressure fuel passes through the jet ejector 420 and draws the air-fuel vapor mixture from the fuel tank 440. Accordingly, the mixture of liquid fuel from the airframe pump 410, and air vapor from the ullage 444 are mixed, and as a result of the action of the jet ejector 420, the liquid fuel and air mixture, now a fuel rich mixture, breaks down into droplets.

In various examples, when the fuel rich mixture passes through the vaporizer 430 and is heated to transform into a vapor mixture, the vapor mixture is then supplied to the ullage 444 via the inlet 432 so as to render the environment of the ullage 444 more fuel rich and thus less likely to sustain any combustion of fuel 448 in the fuel tank 440. In other examples, in order to reduce the power or consumption of high-pressure fuel, the controller 450 may stop the power supply to the vaporizer 430 and/or may close the control valve from the airframe pump 410. In other examples, the controller 450 may regulate the power input to the vaporizer 430 in order to achieve proper vaporization of the fuel 448, which includes rendering the fuel 448 less likely to explode due to the modified fuel-air ratio in the ullage 444. With respect to the timing of opening of the valve 415 and other nozzles in, e.g., the jet ejector 420, these valves and nozzles may be open before the aircraft takes off, and may be closed after the aircraft lands. Accordingly, fuel vapor is inserted in the ullage 444 in a continuous manner in such a way as to inert the fuel 448 in the fuel tank 440 and prevent combustion of the fuel 448. The continuous transfer of fuel vapor in the ullage 444 shifts the envelope illustrated in FIG. 2 to a position such as area 230 that is outside, e.g., towards higher fuel vapor concentrations, of the combustion envelopes 210 or 220.

FIG. 4B illustrates a schematic view of a fuel tank inerting system 405 for inerting a fuel tank through continuous enrichment of the ullage using fuel vapor. The system illustrated in FIG. 4B is similar to the system illustrated in FIG. 4A except for the addition of a sensor 419, which may be a pressure sensor or a temperature sensor or a combination of both a pressure sensor and a temperature sensor, in the ullage 444 and a controller 450 configured to manage the overall operation of the system 405. In FIG. 4B, a pressure sensor 418 may be coupled to the valve 415 so as to measure and control the amount of pressure delivered from the valve 415 to the jet ejector 420. The pressure sensor 418 may be disposed downstream of the fuel pump 410 and upstream of the jet ejector 420. Controller 450 may be operationally coupled to, e.g., the valve 415 and to the vaporizer 430 of the fuel tank inerting system 400. For example, the controller 450 may be configured to calculate the amount of fuel vapor to be injected in the ullage 444 depending on parameters such as, e.g., the altitude, the fuel temperature, the amount of fuel 448 present in the tank 440. In other examples, the controller 450 may be operationally coupled to, and receive such information from, e.g., pressure and/or temperature sensor 419, or data from a fuel quality indicating system (FQIS, not shown) present in the fuel tank 440. For example, the controller 450 may control closing and opening of valve 415 from motive flow supply coming out of the pump 410, may manage operation of a nozzle (not shown) within the jet ejector 420, and may control the power supply to the vaporizer 430 to produce an amount of vapor that may be calibrated to reduce or prevent the occurrence of combustion in the fuel tank 440. These valves may be controlled by the controller 450 to open and/or close, as determined by the controller 450, in order to arrive at an fuel-air ratio in the fuel tank 440 that reduces or prevents the occurrence of combustion in the fuel tank 440. Such fuel-air ratio may be, e.g., a "rich" fuel-air ratio, as discussed above with respect to FIG. 2 and area 230.

In various examples, the controller 450 may also calculate the amount of fuel vapor in the ullage 444 that is required to shift the fuel-air ratio to a range that is beyond the flammable or combustion zone based on e.g., fuel temperature, altitude, amount of air-fuel vapor, and atmospheric pressure. For example, the controller 450 may open a flow control valve or nozzle (not shown) at the jet ejector 420, and high-pressure fuel passes through the jet ejector 420 and draws the air-fuel vapor mixture from the fuel tank 440. Accordingly, the mixture of liquid fuel from the airframe pump 410, and air vapor from the ullage 444 are mixed, and as a result of the action of the jet ejector 420, the liquid fuel and air mixture, now a fuel rich mixture, breaks down into droplets. In order to reduce the power or consumption of high-pressure fuel, the controller 450 may stop the power supply to the vaporizer 430 and/or may close the control valve from the airframe pump 410. In other examples, the controller 450 may regulate the power input to the vaporizer 430 in order to achieve proper vaporization of the fuel 448, which includes rendering the fuel 448 less likely to explode due to the modified fuel-air ratio in the ullage 444.

In various examples, advantages of the fuel tank inerting systems 400 and 405 discussed above include having a low life cycle due to the simplicity thereof, the relatively low weight, the substantial reliability, substantial safety, and the use of existing system resources such as, e.g., motive fuel, at the airframe pump 410. In other examples, various additional features of the fuel tank inerting systems 400 and 405 that may be inherent or advantageous to the proper operation of a fuel tank system such as, e.g., an aircraft fuel tank system, are described in U.S. Pat. No. 12,258,142, filed on Apr. 26, 2022, titled "System and Method for Reducing the Concentration of Fuel Vapor in the Ullage of a Fuel Tank," and incorporated herein by reference in its entirety.

Figure 5A:
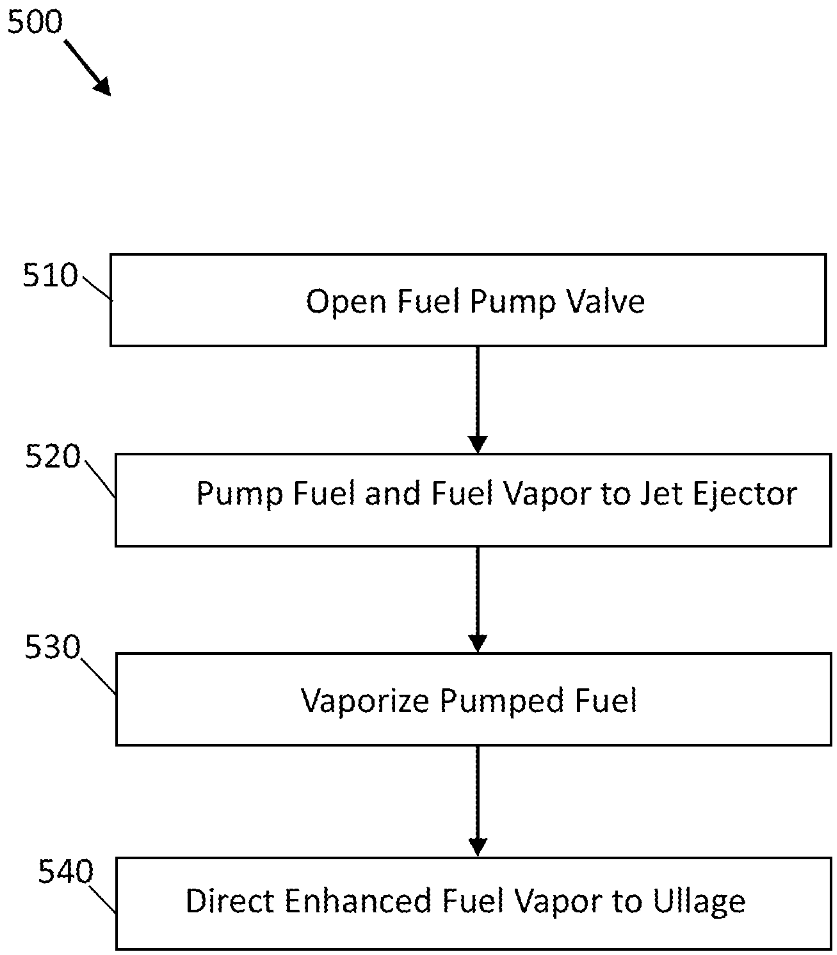
FIGS. 5A-5C are flow charts illustrating methods of inerting an aircraft fuel tank through continuous enrichment of ullage using fuel vapor, in accordance with examples of the present disclosure.
Figure 5B:
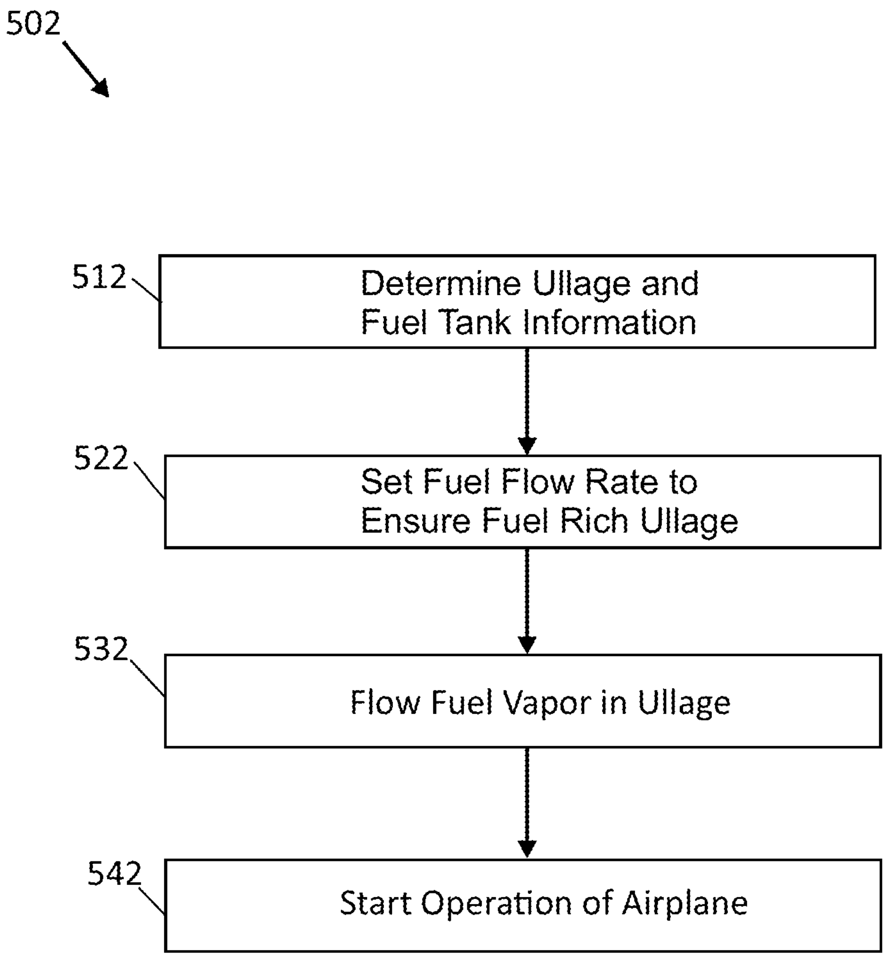
Figure 5C:
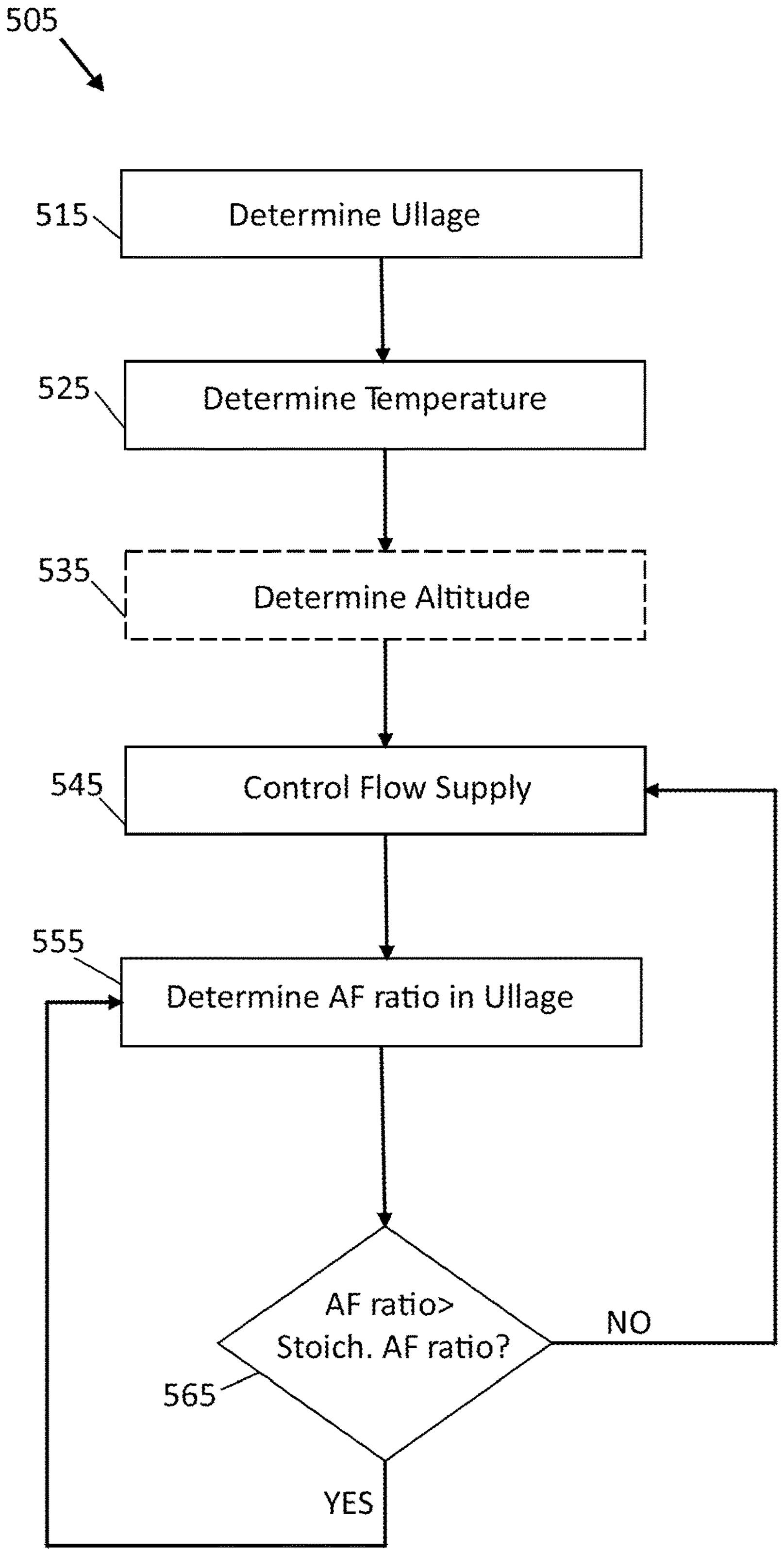

FIGS. 5A-5C are flow charts illustrating methods of inerting an aircraft fuel tank through continuous enrichment of ullage using fuel vapor, in accordance with examples of the present disclosure. For example, FIG. 5A is a method 500 for inerting a fuel tank in a fuel tank inerting system, the system including a fuel pump, a fuel pump valve, a jet ejector, and a fuel vaporizer. During operation 510, the method 500 includes opening the fuel pump valve. For example, the fuel tank inerting system further includes a controller, and opening the fuel pump valve includes determining that the fuel-air ratio in the ullage is less than the flammable fuel-air ratio and sending a control signal from the controller to the fuel pump valve. During operation 520, the method 500 includes pumping fuel from the fuel pump, through the fuel pump valve, and towards the jet ejector to mix with fuel vapor pulled from the ullage to the jet ejector. For example, pumping fuel from the fuel pump during operation 520 includes sending a control signal from the controller to the fuel pump in response to determining the fuel-air ratio in the ullage is less than the flammable fuel-air ratio. In an example, determining the fuel-air ratio in the ullage is less than the flammable fuel-air ratio includes receiving, at the controller, an ullage pressure reading from a pressure sensor disposed at the ullage.

During operation 530, the method 500 includes heating the pumped fuel to vaporize the pumped fuel to generate an enhanced fuel vapor. For example, heating the pumped fuel to generate the fuel vapor is performed at a vaporizer. During operation 540, the method 500 includes directing the enhanced fuel vapor to the ullage. In various examples, the fuel-air ratio in the ullage is maintained at greater than a flammable fuel-air ratio. In another example, the fuel tank is an aircraft fuel tank, and the method 500 further includes starting operation of the aircraft after the fuel-air ratio in the ullage is set at greater than the flammable fuel-air ratio. In an example, the method 500 further includes determining that the fuel-air ratio within the ullage is no less than the flammable fuel-air ratio, and closing the fuel pump valve. Determining that the fuel-air ratio within the ullage is no less than the flammable fuel-air ratio may include receiving, at the controller, a flow pressure reading from a pressure sensor disposed upstream of the jet ejector and downstream of the fuel pump.

FIG. 5B is a flow chart illustrating a method 502 of inerting an aircraft fuel tank through continuous enrichment of ullage, in accordance with examples of the present disclosure. In FIG. 5B, during operation 512, the ullage and the fuel tank are obtained. In addition, the type of fuel such as, e.g., kerosene or wide-cut fuel, may be determined, as well as other parameters such as, e.g., the pressure and the temperature in the ullage. During operation 522, based on the information obtained during operation 512 relative to the ullage and the fuel tank, as well as the type of fuel being used in the aircraft, various parameters such as, e.g., valve opening in a fuel pump, nozzle opening in a fuel ejector, and the like, may be set in order to ensure continuous enrichment of the ullage. The valve opening may be the opening of valve 415 discussed above with respect to FIGS. 4A-4B.

During operation 522, the various above parameters may be set so as to satisfy at least equation (1) discussed above. Specifically, the various parameters may be set so that the ratio of the mass of fuel vapor in the ullage over the mass of air in the ullage remains constantly over 0.24. In other examples, the various above parameters may be set so as to satisfy equation (2) discussed above. For example, the various parameters may be set so that the ratio of the mass of fuel vapor in the ullage over the mass of air in the ullage may be up to, or equal to, 1. Accordingly, when either one of equations (1) and (2) are satisfied, it can be ensured that the ullage is constantly in a fuel-rich environment, which prevents or substantially reduces the occurrence of combustion of the fuel in the fuel tank.

Once the various parameters are set during operation 522, the method 502 continues to operation 532, during which fuel is flowed from a fuel pump to a vaporizer, and the resulting fuel vapor is flowed to the ullage. The fuel pump may be similar to fuel pump 410 discussed above with respect to FIGS. 4A and 4B, the vaporizer may be similar to vaporizer 430, and the ullage may be similar to ullage 444 illustrated in FIGS. 4A and 4B. Thus, during operation 532, fuel vapor originating as fuel delivered by the fuel pump is flowed to the ullage as fuel vapor. As the fuel vapor continuously flows to the ullage, the ullage is continuously maintained in a "fuel rich" environment.

In various examples, once the fuel vapor is continuously flowing to the ullage, thus rendering the ullage fuel rich during operation 532, the method continues to operation 542 during which the aircraft may start operation. For example, the aircraft may start operating and taking off.

FIG. 5C is a flow chart illustrating another method 505 of inerting an aircraft fuel tank through continuous enrichment of ullage, in accordance with examples of the present disclosure. In FIG. 5C, during operation 515, a controller such as, e.g., the controller 450 discussed above with respect to FIG. 4B, determines the ullage of the fuel tank. In various examples, determining the ullage of the fuel tank may be performed via fuel level sensors in the fuel tank such as, e.g., pressure and/or temperature sensor 419, and the ullage may be derived from the quantity, or level, of fuel present in the fuel tank. During operation 525, the temperature of the fuel and/or the fuel tank is determined. In examples, the temperature of the fuel tank may be determined via one or more temperature sensors disposed in the fuel and/or fuel tank such as sensor 419. During operation 535, the altitude of the fuel and/or the fuel tank may be determined. In examples, in the case of an aircraft, the altitude of the fuel tank is the altitude of the aircraft and may be determined via one or more altimeters in the aircraft.

In various examples, during operation 545, the flow supply of fuel from, e.g., an airframe pump such as pump 410 illustrated in FIG. 4B, is controlled. For example, the flow supply is controlled by a controller such as the controller 450 via a valve 415, both discussed above with respect to FIG. 4B. In examples, the mixture of air and fuel vapor that is recycled in the fuel tank may be determined by the controller 450 via the actuation of, e.g., a valve or nozzle such as the valve 415 discussed above with respect to FIG. 4B, and the amount of fuel ejected by, e.g., the jet ejector 420.

In various examples, during operation 555, the fuel-air ratio in the ullage is determined. For example, a controller such as the controller 450 may compute or determine the fuel-air ratio in the ullage, e.g., using equations 310 and 320 discussed above with respect to FIG. 3. In various examples, the fuel-air ratio in the ullage may be determined in a continuous manner, or at regular intervals. During operation 565, the determined fuel-air ratio is compared to the flammable fuel-air ratio. In examples, the flammable fuel-air ratio is the fuel-air ratio for which complete combustion of the fuel present in the fuel tank may take place. In examples, during operation 565, if the determined air fuel ratio of the ullage is greater than the flammable air fuel ratio, e.g., "YES" in FIG. 5C, which is indicative that the ullage is too rich and thus outside of the fuel combustion zone, then operation returns to operation 555, where the fuel-air ratio continues to be monitored. For example, the ullage being too rich is illustrated in FIG. 2 as area 230 to the right of, e.g., the "kerosene (rich)" curve and thus outside of the combustion envelope 220.

In other examples, during operation 565, if the determined fuel-air ratio of the ullage is not greater than the flammable air fuel ratio, e.g., "NO" in FIG. 5, which is indicative that the ullage is not too rich and may thus be inside of the fuel combustion zone, then operation returns to operation 545, where the flow supply of fuel may be adjusted or increased so as to have a fuel vapor in the ullage that is "rich," or in area 230 outside the envelope 220 discussed above with respect to FIG. 2. Accordingly, when the flow supply of fuel is adjusted or increased, operation continues to operation 555 where the fuel-air ratio in the ullage is determined anew, and operation 565 is performed subsequently to operation 555 as discussed above.

Accordingly, in comparing the flow chart illustrated in FIG. 5B to the flow chart illustrated in FIG. 5C, the FIG. 5B does not include the use of the controller, and the flow supply of fuel is preset so as to continuously provide a fuel rich vapor in the ullage in order to ensure that the fuel vapor mixture in the ullage is substantially always in a zone where the air fuel ratio is rich, i.e., a zone where ignition and/or combustion of the fuel in the fuel tank is substantially reduced or prevented. Accordingly, the ullage is maintained in a rich zone, such as the zone 230 to the right of the "kerosene (rich)" curve 222 in the plot of FIG. 2 described above.

Figure 6:
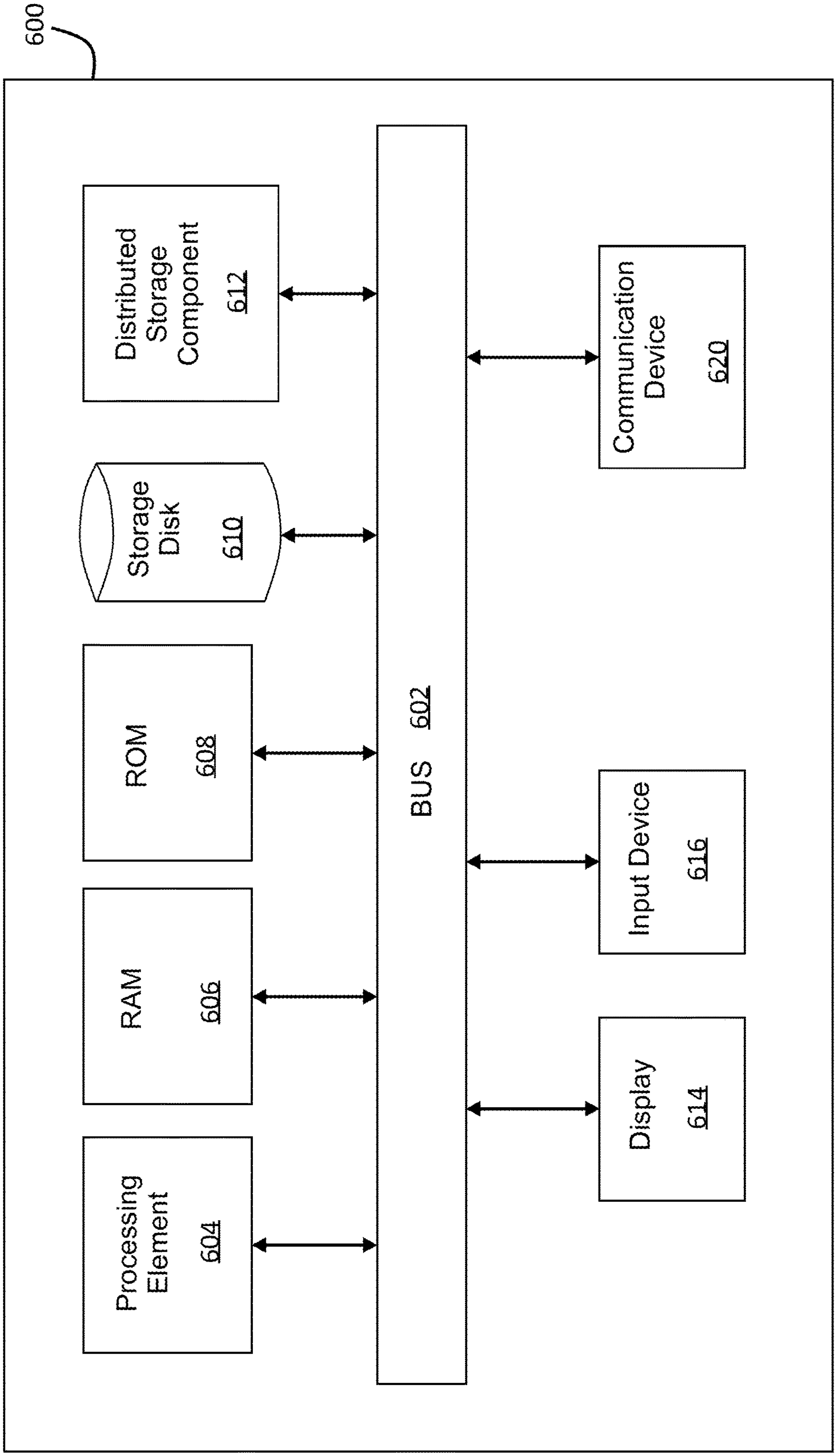
FIG. 6 depicts a block diagram of a computing device in accordance with examples of the present disclosure.

FIG. 6 depicts a block diagram of a computing device, according to various principles of the present disclosure. In the illustrated example, the computing device 600 may include a bus 602 or other communication mechanism of similar function for communicating information, and at least one processing element 604 (collectively referred to as processing element 604) coupled with bus 602 for processing information. As will be appreciated by those skilled in the art, the processing element 604 may include a plurality of processing elements or cores, which may be packaged as a single processor or in a distributed arrangement. Furthermore, a plurality of virtual processing elements 604 may be included in the computing device 600 to provide the control or management operations for the system 400 and to the method 502 illustrated above.

The computing device 600 may also include one or more volatile memory(ies) 606, which can for example include random access memory(ies) (RAM) or other dynamic memory component(s), coupled to one or more busses 602 for use by the at least one processing element 604. Computing device 600 may further include static, non-volatile memory(ies) 608, such as read only memory (ROM) or other static memory components, coupled to busses 602 for storing information and instructions for use by the at least one processing element 604. A storage component 610, such as a storage disk or storage memory, may be provided for storing information and instructions for use by the at least one processing element 604. As will be appreciated, the computing device 600 may include a distributed storage component 612, such as a networked disk or other storage resource available to the computing device 600.

The computing device 600 may be coupled to one or more displays 614 for displaying information to a user, and to an input device 616 for inputting information or instructions. The computing device 600 may further include an input/output (I/O) component, such as a serial connection, digital connection, network connection, or other input/output component for allowing intercommunication with other computing components and the various components of the system 400 and to the method 502 illustrated above.

In various embodiments, computing device 600 can be connected to one or more other computer systems via a network to form a networked system. Such networks can for example include one or more private networks or public networks, such as the Internet. In the networked system, one or more computer systems can store and serve the data to other computer systems. The one or more computer systems that store and serve the data can be referred to as servers or the cloud in a cloud computing scenario. The one or more computer systems can include one or more web servers, for example. The other computer systems that send and receive data to and from the servers or the cloud can be referred to as client or cloud devices, for example. Various operations of the system 400 and the method 502 illustrated above may be supported by operation of the distributed computing systems.

The computing device 600 may be operative to control operation of the components of the system 400 and the method 502 illustrated above through a communication device such as, e.g., communication device 620, and to handle data provided from the data sources as discussed above with respect to the system 400 and to the method 502. In some examples, analysis results are provided by the computing device 600 in response to the at least one processing element 604 executing instructions contained in memory 606 or 608 and performing operations on the received data items. Execution of instructions contained in memory 606 and/or 608 by the at least one processing element 604 can render the system 400 and the method 502 operative to perform methods described herein.

The term "computer-readable medium" as used herein refers to any media that participates in providing instructions to the processing element 604 for execution. Such a medium may take many forms, including but not limited to, non-volatile media, volatile media, and transmission media. Non-volatile media includes, for example, optical or magnetic disks, such as disk storage 610. Volatile media includes dynamic memory, such as memory 606. Transmission media includes coaxial cables, copper wire, and fiber optics, including the wires that include bus 602.

Common forms of computer-readable media or computer program products include, for example, a floppy disk, a flexible disk, hard disk, magnetic tape, or any other magnetic medium, a CD-ROM, digital video disc (DVD), a Blu-ray Disc, any other optical medium, a thumb drive, a memory card, a RAM, PROM, and EPROM, a FLASH-EPROM, any other memory chip or cartridge, or any other tangible medium from which a computer can read.

Various forms of computer readable media may be involved in carrying one or more sequences of one or more instructions to the processing element 604 for execution. For example, the instructions may initially be carried on the magnetic disk of a remote computer. The remote computer can load the instructions into its dynamic memory and send the instructions over a telephone line using a modem. A modem local to computing device 600 can receive the data on the telephone line and use an infra-red transmitter to convert the data to an infra-red signal. An infra-red detector coupled to bus 602 can receive the data carried in the infra-red signal and place the data on bus 602. Bus 602 carries the data to memory 606, from which the processing element 604 retrieves and executes the instructions. The instructions received by memory 606 and/or memory 608 may optionally be stored on storage device 610 either before or after execution by the processing element 604.

In accordance with various embodiments, instructions operative to be executed by a processing element to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed.

Various examples of the disclosure are implemented with respect to the following aspects.

Aspect 1: A system for inerting a fuel tank, the fuel tank including a liquid fuel region and an ullage, the system including a fuel pump, a jet ejector, a first flow path extending between the fuel pump and the jet ejector, a valve disposed along the first flow path, the valve allowing fuel to flow along the first flow path from the fuel pump to the jet ejector when open, the valve blocking the fuel flow from the fuel pump to the jet ejector when closed, a second flow path extending from the ullage of the fuel tank to the jet ejector to allow fuel vapor and air mixture from the ullage to travel from the ullage to the jet ejector and to mix with the fuel from the fuel pump, a vaporizer disposed downstream of the jet ejector, the vaporizer being configured to vaporize the fuel received from the jet ejector into the fuel vapor and air mixture from the ullage to generate an enhanced fuel vapor and air mixture, and a third flow path along which the enhanced fuel vapor and air mixture flows from the vaporizer to the ullage so that an fuel-air ratio in the ullage of the fuel tank is maintained at greater than a flammable fuel-air ratio.

Aspect 2: The system of aspect 1, wherein a ratio of a mass of fuel vapor to a mass of air in the ullage is equal to or greater than 0.24.

Aspect 3: The system of aspect 1 or aspect 2, wherein the enhanced fuel-air ratio includes a richer fuel-air ratio.

Aspect 4: The system of any one of aspects 1-3, further including a flame arrestor disposed between the jet ejector and the vaporizer.

Aspect 5: The system of any one of aspects 1-4, further including a flame arrestor disposed along the third flow path.

Aspect 6: The system of any one of aspects 1-5, wherein the vaporizer includes a heater.

Aspect 7: The system of any one of aspects 1-6, wherein the fuel tank is an aircraft fuel tank.

Aspect 8: The system of any of aspects 1-7, further including a controller configured to manage operation of the valve.

Aspect 9: The system of aspect 8, wherein the controller is configured to manage operation of the fuel pump.

Aspect 10: The system of aspect 8 or aspect 9, wherein the controller is configured to manage operation of the vaporizer.

Aspect 11: The system of any one of aspects 8-10, further including one or more sensors operationally coupled to the controller, wherein the controller is configured to manage operation of the valve at least partly based on information provided by the one or more sensors.

Aspect 12: The system of aspect 11, wherein the one or more sensors includes a pressure sensor disposed in the ullage.

Aspect 13: The system of aspect 11 or aspect 12, wherein the one or more sensors includes a pressure sensor disposed downstream of the fuel pump and upstream of the jet ejector.

Aspect 14: The system of aspect 13, wherein the one or more sensors include one of a pressure sensor, a temperature sensor, or a combination of a pressure sensor and a temperature sensor.

Aspect 15: A method for inerting a fuel tank in a fuel tank inerting system, the system including a fuel pump, a fuel pump valve, a jet ejector, and a fuel vaporizer, the method including opening the fuel pump valve, pumping fuel from the fuel pump, through the fuel pump valve, and towards the jet ejector to mix with fuel vapor and air mixture pulled from the ullage to the jet ejector, heating the pumped fuel to vaporize the pumped fuel to generate an enhanced fuel vapor and air mixture, and directing the enhanced fuel vapor and air mixture to the ullage, whereby an fuel-air ratio in the ullage is maintained at greater than a flammable fuel-air ratio.

Aspect 16: The method of aspect 15, wherein the fuel tank is an aircraft fuel tank, and the method further includes starting operation of the aircraft after the fuel-air ratio in the ullage is set at greater than the flammable fuel-air ratio.

Aspect 17: The method of aspect 15 or aspect 16, wherein heating the pumped fuel vapor is performed at a vaporizer.

Aspect 18: The method of any one of aspects 15-17, wherein the fuel tank inerting system further includes a controller, and opening the fuel pump valve includes determining that the fuel-air ratio in the ullage is less than the flammable fuel-air ratio, and sending a control signal from the controller to the fuel pump valve.

Aspect 19: The method of aspect 18, wherein pumping fuel from the fuel pump includes sending a control signal from the controller to the fuel pump in response to determining the fuel-air ratio in the ullage is less than the flammable fuel-air ratio.

Aspect 20: Aspect The method of any one of aspects 18-19, wherein determining the fuel-air ratio in the ullage is less than the flammable fuel-air ratio includes receiving, at the controller, an ullage pressure reading from a pressure sensor disposed at the ullage.

Aspect 21: The method of any one of aspects 15-20, further including determining that the fuel-air ratio within the ullage is no less than the flammable fuel-air ratio, and closing the fuel pump valve.

Aspect 22: The method of any one of aspects 18-21, wherein determining that the fuel-air ratio within the ullage is no less than the flammable fuel-air ratio includes receiving, at the controller, a flow pressure reading from a pressure sensor disposed upstream of the jet ejector and downstream of the fuel pump.

Aspect 23: A system for inerting a fuel tank, the system including a fuel pump, a fuel pump valve coupled to the fuel pump, a jet ejector in fluid communication with the fuel pump valve, a fuel vaporizer coupled to the jet ejector, one or more sensors at least at the fuel pump valve and in the fuel tank, the one or more sensors including one of a temperature sensor, a pressure sensor, or a combination of a temperature sensor and a pressure sensor, an updatable data repository, a processor operatively coupled to the one or more sensors, the fuel pump, the fuel pump valve, the jet ejector, the vaporizer, and to the updatable data repository, and a memory coupled to the processor, the memory storing instructions that, when executed by the processor, perform a set of operations including determining, via the one or more sensors, at least one of an ullage of the fuel tank, a fuel present in the fuel tank, a pressure inside the fuel tank and a temperature inside the fuel tank, setting, via the processor, system parameters so as to ensure a fuel rich ullage, and based set system parameters, controlling, via the processor, a flow of fuel vapor in the ullage to maintain an fuel-air ratio in the ullage to be greater than a flammable fuel-air ratio.

Aspect 24: The system of aspect 23, wherein the set of operations includes controlling the flow of fuel vapor in the ullage by controlling an amount of motive flow fuel and an amount of fuel vapor from the ullage being mixed together in the jet ejector to create a droplets mixture, transferring the droplets mixture from the jet ejector to the vaporizer, vaporizing the droplets mixture into fuel vapor, and transferring the fuel vapor into the ullage.

Aspect 25: The system of aspect 23 or aspect 24, wherein the fuel-air ratio is such that fuel combustion does not occur.

Aspect 26: The system of any one of aspects 23-25, wherein a ratio of a mass of fuel vapor to a mass of air in the ullage is equal to or greater than 0.24.

Various modifications and alterations of this disclosure will become apparent to those skilled in the art without departing from the scope and spirit of this disclosure, and it should be understood that the inventive scope of this disclosure is not to be unduly limited to the illustrative embodiments set forth herein.

What is claimed is:

1. A system for inerting a fuel tank, the fuel tank including a liquid fuel region and an ullage, the system comprising:

a fuel pump;

a jet ejector;

a first flow path extending between the fuel pump and the jet ejector;

a valve disposed along the first flow path, the valve allowing fuel to flow along the first flow path from the fuel pump to the jet ejector when open, the valve blocking the fuel flow from the fuel pump to the jet ejector when closed;

a second flow path extending from the ullage of the fuel tank to the jet ejector to allow fuel vapor and air mixture from the ullage to travel from the ullage to the jet ejector and to mix with the fuel from the fuel pump;

a vaporizer disposed downstream of the jet ejector, the vaporizer being configured to vaporize the fuel received from the jet ejector into the fuel vapor and air mixture from the ullage to generate an enhanced fuel vapor and air mixture; and a third flow path along which the enhanced fuel vapor and air mixture flows from the vaporizer to the ullage so that an fuel-air ratio in the ullage of the fuel tank is maintained at greater than a flammable fuel-air ratio.

2. The system of claim 1, wherein a ratio of a mass of fuel vapor to a mass of air in the ullage is equal to or greater than 0.24.

3. The system of claim 1, further comprising a flame arrestor disposed at least one of between the jet ejector and the vaporizer and along the third flow path.

4. The system of claim 1, wherein the vaporizer comprises a heater.

5. The system of claim 1, further comprising a controller configured to manage operation of the valve.

6. The system of claim 5, wherein the controller is configured to manage operation of at least one of the fuel pump and of the vaporizer.

7. The system of claim 5, further comprising one or more sensors operationally coupled to the controller, wherein the controller is configured to manage operation of the valve at least partly based on information provided by the one or more sensors.

8. The system of claim 7, wherein the one or more sensors comprise at least one of a pressure sensor disposed in the ullage and a pressure sensor disposed downstream of the fuel pump and upstream of the jet ejector.

9. The system of claim 7, wherein the one or more sensors comprise one of a pressure sensor, a temperature sensor, or a combination of a pressure sensor and a temperature sensor.

10. A method for inerting a fuel tank in a fuel tank inerting system, the system comprising a fuel pump, a fuel pump valve, a jet ejector, and a fuel vaporizer, the method comprising:

opening the fuel pump valve;

pumping fuel from the fuel pump, through the fuel pump valve, and towards the jet ejector to mix with fuel vapor and air mixture pulled from the ullage to the jet ejector;

heating the pumped fuel to vaporize the pumped fuel to generate an enhanced fuel vapor and air mixture; and directing the enhanced fuel vapor and air mixture to the ullage;

whereby a fuel-air ratio in the ullage is maintained at greater than a flammable fuel-air ratio.

11. The method of claim 10, wherein the fuel tank is an aircraft fuel tank, and the method further comprises starting operation of the aircraft after the fuel-air ratio in the ullage is set at greater than the flammable fuel-air ratio.

12. The method of claim 10, wherein the fuel tank inerting system further comprises a controller, and opening the fuel pump valve comprises:

determining that the fuel-air ratio in the ullage is less than the flammable fuel-air ratio; and sending a control signal from the controller to the fuel pump valve.

13. The method of claim 12, wherein pumping fuel from the fuel pump comprises sending a control signal from the controller to the fuel pump in response to determining the fuel-air ratio in the ullage is less than the flammable fuel-air ratio.

14. The method of claim 12, wherein determining the fuel-air ratio in the ullage is less than the flammable fuel-air ratio comprises:

receiving, at the controller, an ullage pressure reading from a pressure sensor disposed at the ullage.

15. The method of claim 10, further comprising:

determining that the fuel-air ratio within the ullage is not less than the flammable fuel-air ratio; and closing the fuel pump valve.

16. The method of claim 15, wherein determining that the fuel-air ratio within the ullage is not less than the flammable fuel-air ratio comprises receiving, at the controller, a flow pressure reading from a pressure sensor disposed upstream of the jet ejector and downstream of the fuel pump.

17. A system for inerting a fuel tank, the system comprising:

a fuel pump;

a fuel pump valve coupled to the fuel pump;

a jet ejector in fluid communication with the fuel pump valve;

a fuel vaporizer coupled to the jet ejector;

one or more sensors at least at the fuel pump valve and in the fuel tank, the one or more sensors comprising one of a temperature sensor, a pressure sensor, or a combination of a temperature sensor and a pressure sensor;

an updatable data repository;

a processor operatively coupled to the one or more sensors, the fuel pump, the fuel pump valve, the jet ejector, the vaporizer, and to the updatable data repository; and a memory coupled to the processor, the memory storing instructions that, when executed by the processor, perform a set of operations comprising:

determining, via the one or more sensors, at least one of an ullage of the fuel tank, a fuel present in the fuel tank, a pressure inside the fuel tank and a temperature inside the fuel tank;

setting, via the processor, system parameters so as to ensure a fuel rich ullage; and based on set system parameters, controlling, via the processor, a flow of fuel vapor in the ullage to maintain a fuel-air ratio in the ullage to be greater than a flammable fuel-air ratio.

18. The system of claim 17, wherein the set of operations comprises controlling the flow of fuel vapor in the ullage by:

controlling an amount of motive flow fuel and an amount of fuel vapor from the ullage being mixed together in the jet ejector to create a droplets mixture;

transferring the droplets mixture from the jet ejector to the vaporizer;

vaporizing the droplets mixture into fuel vapor; and transferring the fuel vapor into the ullage.

19. The system of claim 17, wherein the fuel-air ratio is such that fuel combustion does not occur.

20. The system of claim 17, wherein a ratio of a mass of fuel vapor to a mass of air in the ullage is equal to or greater than 0.24.

* * * * *